STAIRSTEP FUNCTION GENERATOR CIRCUIT

Filed Feb. 8, 1966

INVENTORS
RICHARD H. FOOTE
JOHN A. HOLMQUIST
BY Wood, Herron & Evans
ATTORNEYS

STAIRSTEP FUNCTION GENERATOR CIRCUIT

Filed Feb. 8, 1966

INVENTORS
RICHARD H. FOOTE
JOHN A. HOLMQUIST
BY Wood, Gust & Irish
ATTORNEYS

United States Patent Office 3,422,363

Patented Jan. 14, 1969

3,422,363

STAIRSTEP FUNCTION GENERATOR CIRCUIT

Richard H. Foote and John A. Holmquist, Fort Wayne, Ind., assignors to International Telephone and Telegraph Corporation, a corporation of Delaware Filed Feb. 8, 1966, Ser. No. 525,905

U.S. Cl. 328—186 7 Claims

Int. Cl. H03k *4/00;* H03k *4/02;* H03k *3/00*

ABSTRACT OF THE DISCLOSURE

A high precision stair-step function generator providing uniform and linear step voltages. A saw tooth wave form generator is provided including a capacitor and a constant current source for providing charging current. A gating circuit is provided for selectively energizing the constant current source during predetermined spaced intervals so as to generate a saw tooth wave form voltage across the capacitor. A buffer amplifier is coupled to the capacitor for amplifying the saw tooth wave form voltage and a feedback circuit is provided coupling the output of the amplifier to the constant current source for feeding back a portion of the stair-step output voltage to the constant current source so as to increase the charging current through the capacitor to compensate for capacitor leakage which occurs between the charging intervals. A discharging circuit is also provided for selectively discharging the capacitor so as to terminate the stair-step wave form voltage.

This invention relates generally to stairstep function generator circuits and more particularly to a high precision stairstep function generator circuit wherein the step voltages are uniform and linear.

There are numerous applications for stairstep function generators including frame scanning in certain television systems. In conventional television systems, a saw tooth wave form voltage is employed for frame scanning, however, there are instances in which it is desirable to provide horizontal scanning lines on the display tube rather than the sloping lines which result from frame scanning with a saw tooth wave form voltage. In such applications, a stairstep function generator is commonly employed for providing the frame sweep voltage thus resulting in the provision of horizontal lines on the display. There are also applications, particularly where the display is employed for making measurements, where it is desirable that equal spacing be provided between the horizontal scanning lines which dictates the employment of a high precision stairstep voltage function, i.e., where the voltage steps are equal in amplitude and highly linear.

Digital-to-analog converters have been employed for the generation of precision stairstep function voltages, however, such converters have been characterized by their complexity and expense. Furthermore, conventional digital-to-analog converters provide high amplitude spikes at the voltage transition points which may have deleterious effects on other parts of the circuitry.

It is accordingly an object of the present invention to provide an improved stairstep function generator.

Another object of the invention is to provide an improved precision stairstep function generator.

A further object of the invention is to provide an improved precision stairstep function generator which is less complex and expensive than prior generators and which does not provide spikes at the voltage transitions.

The invention in its broader aspects comprises means for generation of a saw tooth wave form voltage including a capacitor and constant current source means for providing charging current for the capacitor. Means are provided for selectively energizing the current source means during predetermined spaced intervals thereby generating a saw tooth wave form voltage across the capacitor and means are provided for feeding back a portion of the voltage across the capacitor to the constant current means thereby to increase the charging current through the capacitor to compensate for capacitor leakage which occurs between the charging intervals. Means are provided for selectively discharging the capacitor thereby to terminate the stairstep wave form voltage.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
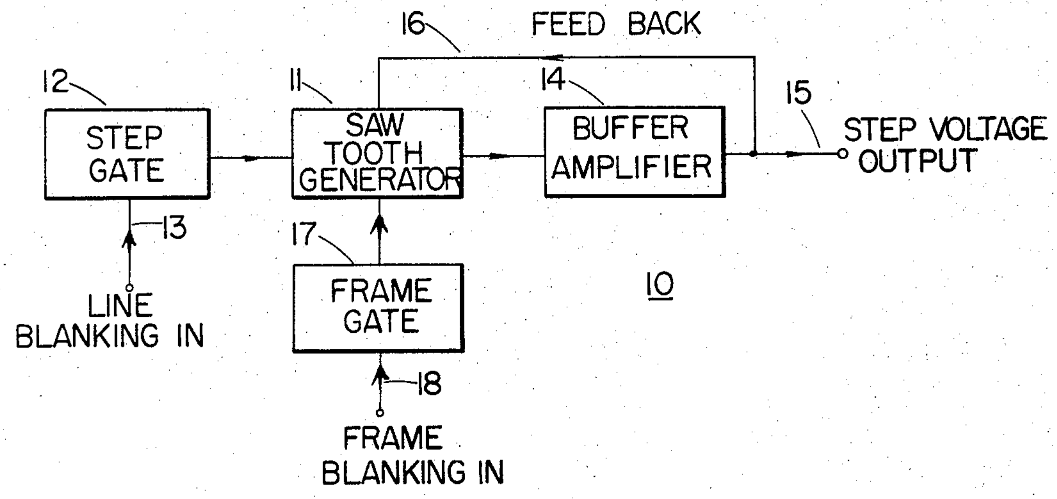
FIG. 1 is a block diagram illustrating the system of the invention.

Referring now to FIG. 1, the improved stairstep function generator circuit of the invention, generally indicated at 10, comprises a saw tooth generator circuit 11 which includes a charging capacitor and a constant current source for providing charging current to the capacitor, the constant current source being normally biased off. A step gate circuit 12 is coupled to the saw tooth generator 11 for selectively turning on the constant current source during spaced intervals thereby to generate a saw tooth wave form across the capacitor. In a television system application, the step gate 12 is actuated by line blanking pulses applied to input circuit 13. A buffer amplifier 14 is coupled to the saw tooth generator 11 for amplifying the stairstep function voltage across the capacitor, buffer amplifier 14 having an output circuit 15.

In order to provide a precision linear stairstep function voltage in the output circuit 15 of the buffer amplifier, a feed back circuit 16 couples a part of the stairstep output voltage in the output circuit 15 back to the constant current source of the saw tooth generator 11 thereby progressively to increase the charging current through the capacitor as the amplitude of the stairstep output voltage is progressively increased.

A frame gate circuit 17 is coupled to the saw tooth generator 11 for selectively terminating the stairstep output voltage. In a television system application for the stairstep function generator of the invention, frame blanking pulses are applied to input circuit 18 of the frame gate circuit 17 for actuating the same to terminate the stairstep output voltage.

Figure 2:
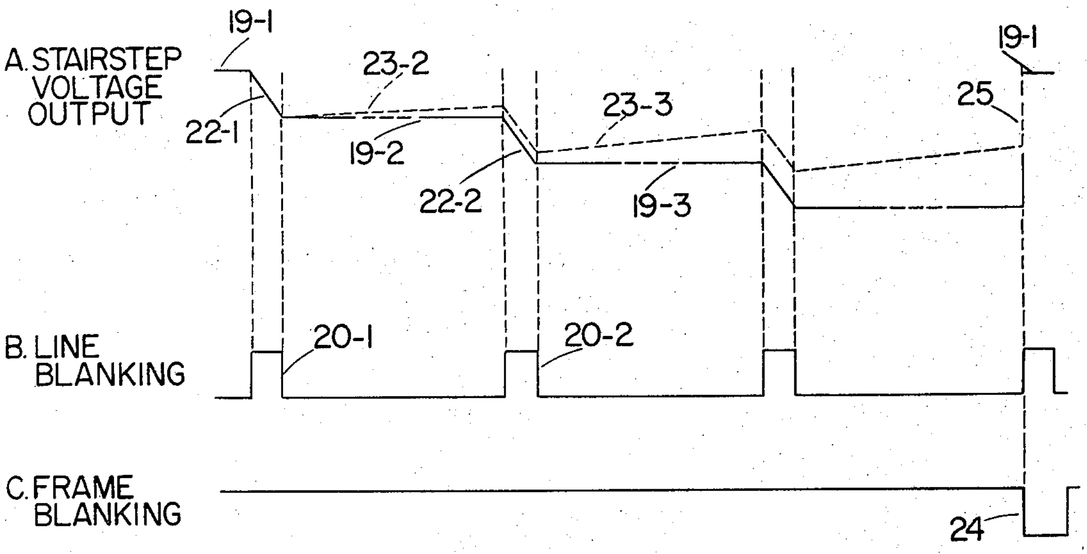
FIG. 2 is a diagram showing the stairstep voltage output of the circuit of FIG. 1 useful in explaining the invention.

Referring now to FIG. 2, and considering a television system application for the stairstep function generator of FIG. 1, at the beginning of a particular frame, the constant current source of the saw tooth generator circuit 11 is biased off and an output voltage level 19–1 is provided in output circuit 15 of buffer amplifier 14. When line blanking pulse 20–1 is applied to input circuit 13 of step gate circuit 12, the step gate circuit is actuated thereby to turn on the constant current source of the saw tooth generator circuit 11 to provide a saw tooth wave form voltage 22–1 in the output circuit 15, the slope of the saw tooth voltage 22–1 being dependent upon the resistance in the charging circuit of the capacitor in the saw tooth generator circuit 11. When the line blanking pulse 20–1 is terminated, the constant current source of the saw tooth generator 11 is again biased off and the saw tooth wave form voltage 22–1 is terminated to provide step voltage level 19–2 in the output circuit 15. The next line blanking pulse 20–2 again actuates step gate circuit 12 to turn on the constant current source of the saw tooth generator circuit 11 to provide a saw tooth wave form output voltage 22–2 in output circuit 15 and termination of the line blanking pulse 20–2 terminates the saw tooth wave form output voltage 22–2 to provide step voltage level 19–3. It will now be seen that a step voltage 22 is generated in response to each line blanking pulse 20 thereby providing the stairstep output voltage shown in FIG. 2A.

It will be recognized that the buffer amplifier circuit 14 coupled to the capacitor of the saw tooth generator circuit 11 has less than infinite impedance, the resulting leakage in the circuit elements coupled to the capacitor tending to discharge the capacitor in the positive direction resulting in compression of the voltage steps as the sweep progresses, as indicated by the dashed lines 23 in FIG. 2A in greatly exaggerated form.

In accordance with the invention, feeding back of a portion of the stairstep output voltage from the output circuit 15 of the buffer amplifier 14 to the constant current source of the saw tooth generator circuit 11 compensates for this leakage and cancels out the effect of loading on the capacitor. Thus, as the leakage increases due to the increased level of the output voltage, the charging current through the capacitor is correspondingly increased so that the voltage steps get progressively larger.

Application of a frame blanking pulse 24 to the frame gate circuit actuates the same to discharge the capacitor of the saw tooth generator circuit 11, as at 25, thereby to return the voltage in the output circuit 15 to the original level 19–1. While only three steps have been shown in the stairstep function voltage shown in FIG. 2A, it will be understood that a typical vertical sweep may require a five hundred step stairstep wave form.

Figure 3:
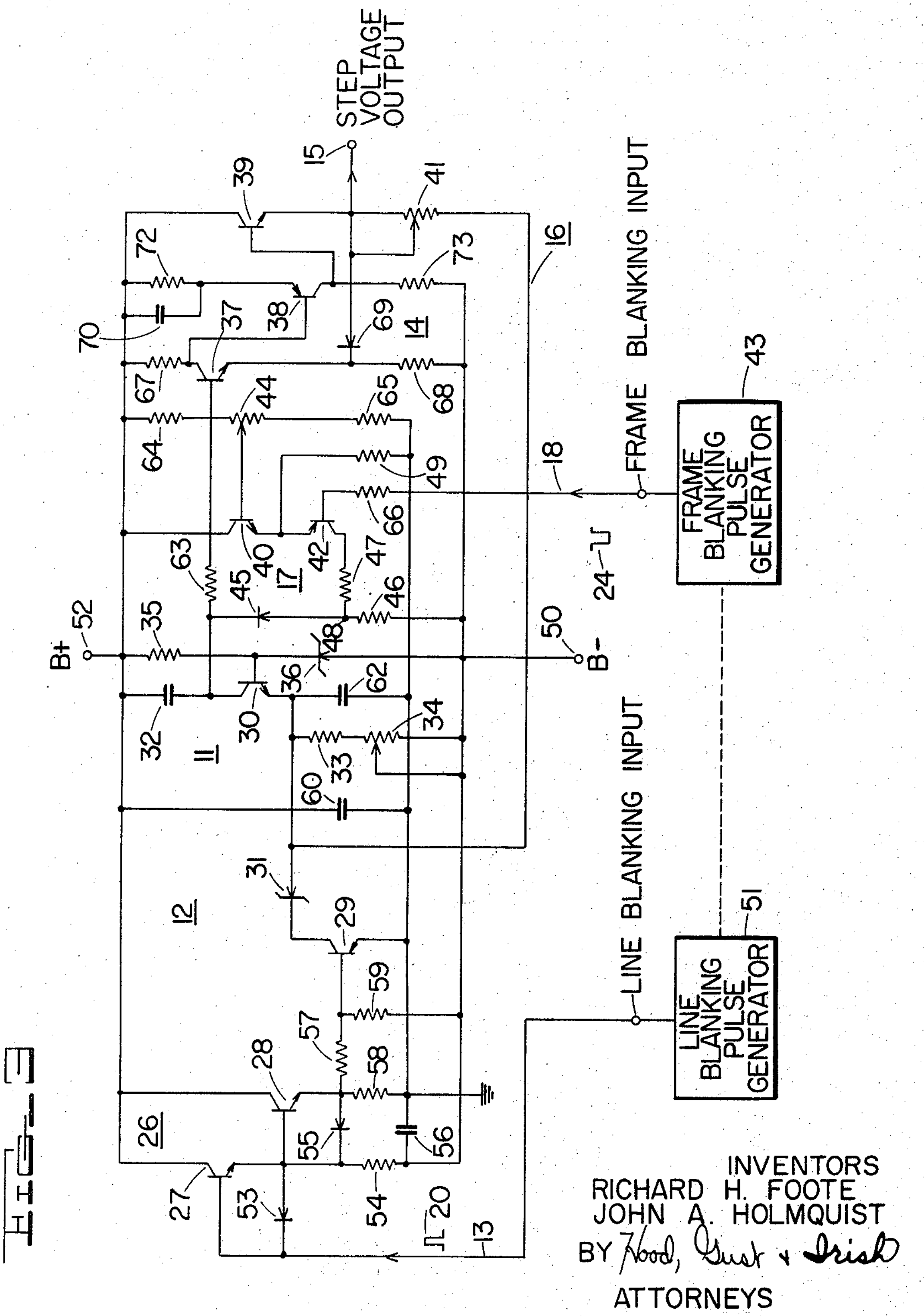
FIG. 3 is a schematic diagram showing the preferred embodiment of the invention.

Referring now to FIG. 3 which schematically illustrates a preferred embodiment of the invention, a conventional line driver 26 couples the line blanking pulse input circuit 13 to the step gate circuit 12, line blanking pulse input circuit 13 being coupled to a conventional line blanking pulse generator 51. Line driver 26 comprises conventional NPN transistors 27 and 28 coupled in a conventional double emitter follower configuration with the emitter of transistor 28 being coupled to the base of PNP transistor 29 of the step gate circuit 12. Transistors 27, 28 are normally biased off while transistor 29 is normally biased on, and thus application of the positive-going blanking pulse 20 to the input circuit 13 will turn on line driver transistors 27, 28 thus applying a positive pulse to the base of transistor 29 to bias the same off.

The constant current portion of the saw tooth generator circuit 11 comprises an NPN transistor 30 with the timing capacitor 32 coupled to its collector and timing resistors 33, 34 coupled to its emitter. A Zener diode 31 couples the collector of step gate transistor 29 to the emitter of transistor 30 and clamps the emitter of transistor 30 to a predetermined voltage, such as a minus 3.3 volts in the illustrated embodiment, when the transistor 29 is conducting. Transistor 30 is normally biased off; however, when transistor 29 is turned off in response to a line blanking pulse 20 as above-described, the minus 3.3 volts clamp on the emitter of transistor 30 is removed thus lowering the emitter source potential to essentially minus 10 volts in the illustrated embodiment thereby turning on transistor 30. When transistor 30 is turned on, charging current flows through the timing capacitor 32 with the slope of the resulting saw tooth wave form charge generated thereacross being determined, in the absence of the feedback connection 16, essentially by the values of timing resistors 33, 34. Base bias for the transistor 30 is provided by resistor 35 and Zener diode 36, which clamps the base of transistor 30 to a potential of minus 6.7 volts in the illustrated embodiment.

The saw tooth wave form voltage generated across the timing capacitor 32 is coupled by coupling resistor 63 to the base of transistor 37 of the buffer amplifier 14 which also includes transistors 38 and 39 coupled in a conventional feed back amplifier circuit. The feed back circuit 16 comprises a potentiometer 41 coupling the output circuit 15 of the buffer amplifier 14 to the emitter of the constant current source transistor 30 thereby to apply a portion of the stairstep output voltage in the output circuit 15 to the emitter of transistor 30 to increase the charging current flow through capacitor 32 thus in turn increasing the slope of the saw tooth voltage generated across capacitor 32. As indicated in FIG. 2, the step-output voltage which appears in output circuit 15 is negative with respect to ground. Connection of output circuit 15 to the emitter of transistor 30 by resistor 41 thus in essence couples an additional negative source potential to the emitter in parallel with resistors 33 and 34, which renders the emitter potential more negative and thus increases the charging current flow through capacitor 32 over that which would prevail in the absence of the feedback connection, the level of the emitter potential and the magnitude of the current increase being proportional to the level of the negative step output voltage.

The frame gating circuit 17 comprises transistors 40, 42, the frame blanking input circuit 18 being coupled to the base of transistor 42 which is normally biased off while transistor 40 is always biased on. Frame blanking pulse input circuit 18 may be coupled to a conventional frame blanking pulse generator 43. The base of frame gating circuit transistor 40 is coupled to potentiometer 44 which establishes the voltage to which the timing capacitor 32 is discharged.

A diode 45 and a resistor 46 are coupled between the collector of transistor 30 and the source 50 of B minus voltage, minus 10 volts in the illustrated embodiment, and a resistor 47 couples the collector of transistor 42 to the midpoint 48 between diode 45 and resistor 46. In the absence of a negative-going frame blanking pulse 24, the diode 45 is back-biased thereby isolating transistors 40, 42 from the timing capacitor 32. A resistor 49 couples the emitters of transistors 40, 42 to ground and in the illustrated embodiment, potentiometer 44 is adjusted to establish a typical voltage of plus 5 volts at the emitters of transistors 40, 42. When the negative-going blanking pulse 24 is applied to the base of transistor 42 thus rendering it conductive, a potential of essentially plus 5 volts is thus applied to point 48 thereby removing the back-bias on diode 45. The diode 45 is now forward-biased by the voltage across capacitor 32, and capacitor 32 thus discharges rapidly through diode 45, resistor 47, transistor 42 and transistor 40 to the source 52 of B plus voltage which is plus 10 volts in the illustrated embodiment.

In a specific embodiment of the invention, the following component values were employed:

| | |
|---|---|
| Transistor **27**—2N706 | Resistor **49**—100K |
| Transistor **28**—2N2270 | Diode **53**—1N914 |
| Transistor **29**—2N1384 | Resistor **54**—82K |
| Transistor **30**—2N2270 | Diode **55**—1N914 |
| Zener diode **31**—1N746 | Capacitor **56**—100 mf. |
| Capacitor **32**—1.0 mf. | Resistor **57**—100 ohms |
| Resistor **33**—82 ohms. | Resistor **58**—1K |
| Resistor **34**—1K | Resistor **59**—10K |
| Resistor **35**—820 ohms | Capacitor **60**—100 mf. |
| Zener diode **36**—1N746 | Capacitor **62**—100 mmf. |
| Transistor **37**—2N338 | Resistor **63**—100 ohms |
| Transistor **38**—2N1384 | Resistor **64**—470 ohms |
| Transistor **39**—2N2270 | Resistor **65**—47 ohms |
| Transistor **40**—2N2270 | Resistor **66**—4.7K |
| Potentiometer **41**—100K | Resistor **67**—100K |
| Transistor **42**—2N1384 | Resistor **68**—2.2K |
| Potentiometer **44**—1K | Diode **69**—1N914 |
| Diode **45**—1N914 | Capacitor **70**—100 mmf. |
| Resistor **46**—10K | Resistor **72**—1K |
| Resistor **47**—100 ohms | Resistor **73**—4.7K |

It will now be seen that there is provided in accordance with the invention a precision stairstep function generator circuit which lends itself to use as a source of frame sweep voltage in a television system which is characterized by its simplicity and linearity which in turn provides minimum distortion in the display.

While there have been described above the principles of this invention in connection with specific apparatus, it is to be clearly understood that this description is made only by way of example and not as a limitation to the scope of the invention.

What is claimed is:

1. A stair-step function generator circuit for generating a stair-step wave form voltage comprising means for generating a saw tooth wave form voltage including a capacitor and constant current source means for providing charging current thereto; means for selectively energizing said current source means during predetermined spaced intervals thereby generating said saw tooth wave form voltage across said capacitor; means for feeding back a portion of the voltage across said capacitor to said constant current means thereby to increase the charging current through said capacitor to compensate for capacitor leakage between said intervals; and means for selectively discharging said capacitor thereby to terminate said stair-step wave form voltage.

2. The circuit of claim 1 wherein said intervals are respectively of equal predetermined duration.

3. The circuit of claim 1 wherein said current source means includes means for normally biasing the same off, and wherein said energizing means is coupled selectively to turn on said current source means.

4. The circuit of claim 1 further comprising amplifier means for amplifying said saw tooth wave form voltage, said feed back means coupling said amplifier means to said current source means.

5. The circuit of claim 1 further comprising means for generating pulses of predetermined fixed duration, said pulses defining said intervals, and wherein said current source means includes means normally biasing the same off, said energizing means including switching means coupled to said current source means and actuated by said pulses for turning said current source means on thereby to pass charging current through said capacitor during said pulses.

6. The circuit of claim 5 further comprising buffer amplifier means having an input circuit coupled to said capacitor for amplifying the saw tooth wave form voltage thereacross, said amplifier means having output circuit means, and wherein said feed back means comprises a feed back connection coupling said output circuit means to said current source means.

7. The circuit of claim 5 further comprising means for generating second pulses, and wherein said discharging means comprises second switching means coupled to said capacitor and actuated by said second pulses for discharging said capacitor during said second pulses.

No references cited.

JOHN S. HEYMAN, *Primary Examiner.*

JOHN ZAZWORSKY, *Assistant Examiner.*

U.S. Cl. X.R.

307—227, 228; 328—183